July 28, 1931. L. BLACKMORE 1,816,563
TIRE CARRIER LOCK
Filed Nov. 30, 1928 2 Sheets-Sheet 1
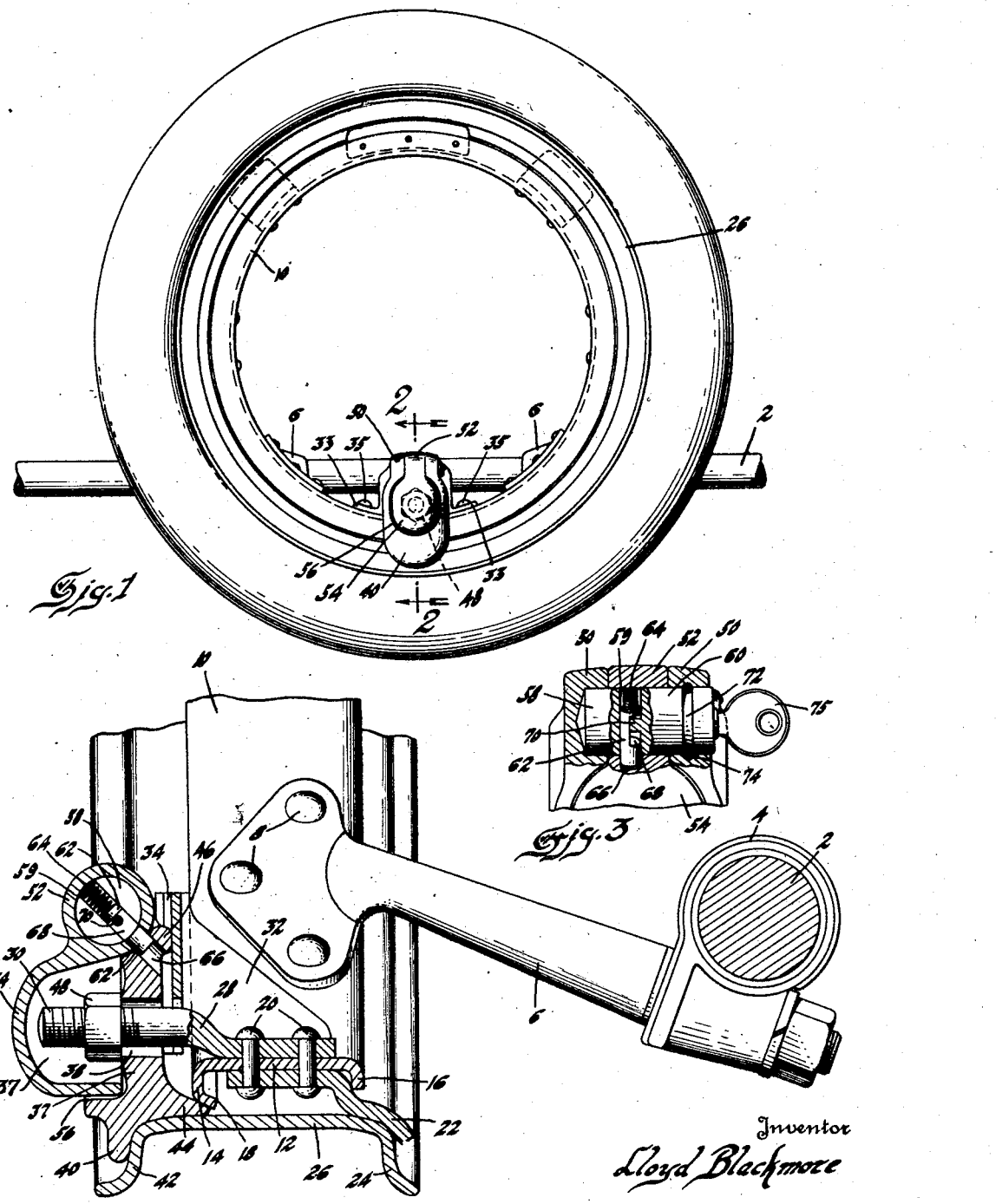
Inventor
Lloyd Blackmore
By Blackmore, Spencer & Fluth
Attorneys

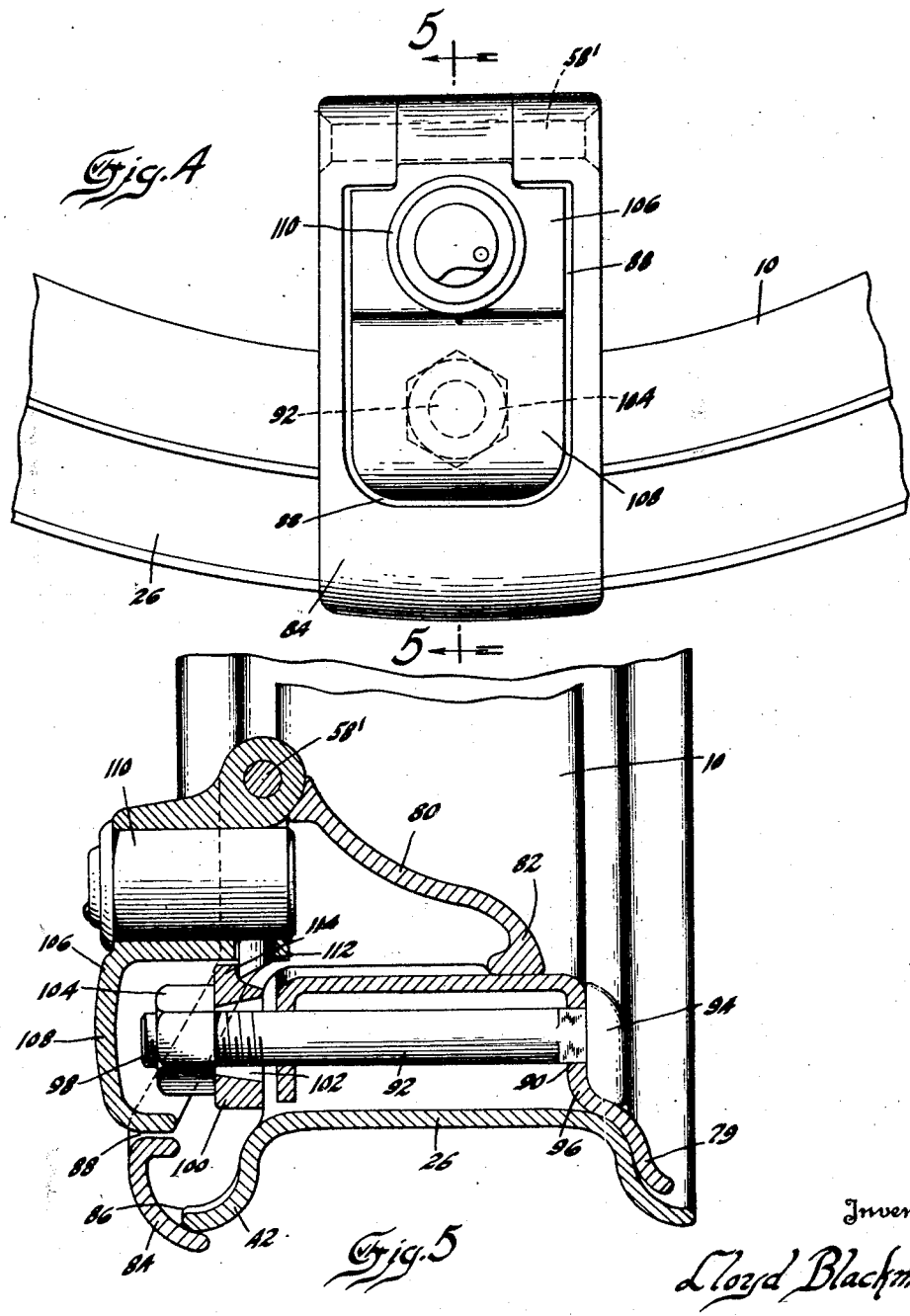

Patented July 28, 1931

1,816,563

UNITED STATES PATENT OFFICE

LLOYD BLACKMORE, OF DETROIT, MICHIGAN, ASSIGNOR TO GENERAL MOTORS CORPORATION, OF DETROIT, MICHIGAN, A CORPORATION OF DELAWARE

TIRE CARRIER LOCK

Application filed November 30, 1928. Serial No. 322,777.

This invention relates to locks and has particular reference to locks used to secure a spare tire and its rim to an automotive vehicle.

It is an object of the invention to construct a simplified lock which has a housing or covering which prevents access to the usual nut which secures the bolt and clamping member against the tire carrying frame and the tire rim.

In prior constructions the housings which have usually protected the securing nut from access have been made either entirely removable or formed a rather complicated portion of the lock or clamping means. In the present invention the closure or housing is pivoted to a locking lug and to secure the housing, the hinge or pivot pin is locked to both of the hinged parts.

As a modification of the invention the closure or housing instead of being locked at its pivot or hinge connection is locked by causing the locking bolt to catch behind a projection or finger on the clamping member which projection is preferably immediately over the securing bolt.

Referring to the drawings:

Fig. 1 is a rear view of a portion of an automotive vehicle showing a spare tire mounted in position.

Fig. 2 is a section on the line 2—2 of Fig. 1.

Fig. 3 is a detailed sectional view through the locking or hinge pin of the invention.

Fig. 4 is a view corresponding to Fig. 1 of a modification.

Fig. 5 is a sectional view on the line 5—5 of Fig. 4.

Referring to the drawings, numeral 2 indicates a bar secured across the rear of an automotive vehicle. To the bar there is secured by means of the sleeves or collars 4 a pair of arms 6 which are secured by means of rivets 8 to a frame 10 which is preferably in the form of a ring. The frame 10 is provided with the web 12 and the lateral flanges 14 and 16. The flange 14 is inwardly turned as shown at 18 to accommodate a part of the locking member, or rims having projecting portions, while to the web 12 there is secured by means of the rivets 20 a flange or clamping arm 22. This clamping arm 22 has preferably a broad end and is adapted to engage the rear flange 24 of the rim 26 as is shown in Fig. 2.

The rivets 20 also secure to the frame 10 a bolt 28 having its free or threaded end 30 projecting well outwardly beyond the frame 10.

The bracket 32 forms a part of the frame 10 and is mounted thereon by means of the ears 33 and rivets 35 and has the outwardly extending portion 34 projecting a considerable distance above the bolt 28. The bracket is preferably integral and straddles both sides of the bolt 28 and is provided with a recess 37 to allow for the extension 30 of the bolt 28.

Adjacent the outer flange 14 and the bracket 32 there is mounted the clamping arm or lug 36 provided with an opening 38 to allow for the passage of the threaded end 30 of the bolt. The lower portion of the clamping arm 36 is provided with a finger 40 which strikes against the outer flange 42 of the rim 26. The finger is preferably broad and is provided with an inwardly projecting portion 44 which is adapted to fit over the web of the rim 26 and against the inwardly flanged portion 18. The upper portion of the clamp 36 is provided with a projection 46 which is adapted to abut against the upper portion 34 of the bracket 32 to properly position the lug 36.

A nut or operating member 48 is screwed on to the threaded end 30 of the bolt 28 and in its final position as shown in Fig. 2 will rigidly clamp or hold the lug 36 against the bracket 32 and rim 26 to rigidly hold the parts in position.

The upper portion of the lug 36 is bifurcated as indicated at 50 and between the furcations there is positioned the ear 52 of a housing or covering 54 which is adapted to fit over and house the nut 48. The lug 36 is provided with a flanged portion 56 which conforms to the shape of the housing or closure 54 when in final position as is shown in Figs. 1 and 2.

The pivotal connection between the furcations 50 and the ear 52 is formed by a hinge pin 58, preferably though not necessarily rigidly mounted in one of the forks 50, and a lock barrel 60 which are seated in suitable openings provided in the furcations 50 and the ear 52. The hinge pin 58 is provided with a recess 59 in which there is adapted to slide the locking pin 62. The locking pin is urged by means of a spring 64 out of the recess and into an opening 66 in the upper portion of the clamp or lug 36. The pin is provided with a recess or cut out portion 68 for the reception of an eccentric pin 70 on the end of the locking barrel 60. By means of a suitable groove 72 and pins 74 the lock barrel 60 is rotatably held in its pivotal connection and from an examination of Fig. 3 it will be apparent that by turning the key 75 the eccentric pin 70 will withdraw the pin 62 against the tension of the spring 64 out of the opening 66 and permit the rotation of the housing member 54 on its pivotal or hinged axis.

If desired a single hinge pin with a rotatable lock barrel therein may be used and the locking pin 62 operate in a recess or opening in the hinge pin or the hinged connection may be made in two parts rigidly secured to the furcations 50 and with the recess 59 split between the parts and a separate rotatable lock barrel applied in the hinge member 60.

The position of the parts when in their locked relation is shown in Figs 2 and 3. From a consideration of the position of the parts as shown it will be apparent that any effort made to swing the housing 54 on its pivot will be prevented by the locking pin 62, due to its engagement in the opening 66, or across the pivotal surface. After the lock barrel 60 and its eccentric pin 70 have withdrawn the locking pin 62 inside the recess 59 in the hinge pin 58 the pivotal connection will be free or unobstructed which will permit the housing 54 to be swung upwardly and render the nut 48 accessible for the application of a wrench or other suitable tool. After the nut has been removed the clamping lug 36 and its connected housing and locking means may be withdrawn, which will permit the withdrawal of the rim 26 from the frame 10.

Referring to the species of Figs. 4 and 5, it will be seen that the hinge pin 58' is of ordinary type and does not have a lock embodied therein as shown in the species of Figs. 1 to 3 inclusive. The frame or support 10 is provided with a flange 79 and instead of the bracket 32, use is made of a clamping member 80 which extends inwardly over the inner periphery of the frame 10 as shown at 82. The lower portion 84 is hook-shaped as shown at 86 and fits over the edge of the flange 42 of the rim 26. The front portion of the clamp 80 is open as shown at 88.

The frame 10 is provided with openings 90 in which there is received the bolt 92. The head 94 of the bolt abuts against one side 96 of the frame 10 while the threaded end 98 extends past the opposite side of the frame as shown in Fig. 5. The flange 79, it will be noted retains one side of the rim 26 on the support or frame 10.

The clamp 80 is provided with a transverse portion 100 having an opening 102 for the reception of the threaded end 98 of the bolt 92. A nut 104 is screw threaded on the end 98 and in the position of the parts shown in Fig. 5, rigidly holds the clamp 80 on to the frame 10 and rim 26.

A closure 106 is pivoted at 58' to the clamp 80 and has a lower housing portion 108 adapted to house and conceal the nut 104. The closure 106 fits rather closely into the opening 88 of the clamp 80 to prevent the insertion of a sharp tool. For purposes of clearer illustration the closure 106 has a relatively wide space between its edge and the edge of the opening 88.

A lock barrel 110 is secured with the closure 106 and has the locking bolt 112. In its locked position (as shown in Fig. 5) the bolt 112 engages behind a projection or finger 114 on the transverse portion 100 of the clamp 80. This projection 114, it will be noted, is positioned immediately over the bolt 92.

The operation of the structure of Figs. 4 and 5 is as follows: The locked position is shown in Fig. 5 and when it is desired to remove the spare tire and its rim 26, a key is inserted in the barrel 110 and the lock rotated, which will cause the withdrawal of the bolt 112 from behind the projection 114. This will permit the swinging of the closure 106 on its hinge 58' which will expose the nut 104 to view and permit the application of a wrench or a suitable tool to unscrew the nut. After the nut is unscrewed the clamp 80 may be bodily removed for the reason that it has no other means for securing it to the rim or frame.

I claim:

1. In a tire carrier lock, a frame for receiving the tire rim, means for rigidly securing said rim to said frame, a hinged covering over said means, a lock in the hinged connection controlling a pin adapted to move from one part of the hinged connection into the other to lock or unlock the connection.

2. In a tire carrier lock, a frame for receiving the tire rim, means for rigidly securing said rim to said frame, said means having an opening, a hinged covering over said means, a lock in the hinged connection including a pin adapted to be moved by the lock into or out of the opening to lock or unlock the connection, respectively.

3. The structure of claim 2, said connection including a hinge bolt having an opening adapted to receive the pin in unlocked position of the lock.

4. In a tire carrier lock, a frame for receiving the tire rim, means for rigidly securing said rim to said frame said means having an opening, a pivoted covering for said means, a pivot pin, a lock in said pivot pin, a spring pressed locking pin slidable in an opening in said pivot pin and adapted to be moved by said lock into and out of said first mentioned opening to lock or unlock said pivotal connection.

5. In a tire carrier lock, a frame for receiving the tire rim, means for rigidly securing said rim to said frame, said means having an opening, a pivoted covering for said means, a pivot pin, a separate lock barrel forming a part of the pivotal connection, one of said pivotal parts having an opening adapted to receive a locking pin, and means for moving said locking pin into and out of said first named opening to lock or unlock said connection respectively.

6. In a means for securing a rim and its spare tire to its support, a bolt permanently secured to said support, a removable clamp abutting the edge of the rim and support said bolt projecting through said clamp, means on the bolt to rigidly hold the clamp against rim and support, a closure pivoted to the clamp and concealing said means, and means for locking the pivot of said closure to said clamp.

7. In a means for securing a rim and its spare tire to its support, a bolt permanently secured to said support, a removable clamp abutting the edge of the rim and support said clamp having an opening to receive said bolt, means on the bolt end to rigidly hold said clamp against said rim and support, a closure pivoted to said clamp and concealing said means, and means for locking the pivot of said closure, to said clamp, said means engaging with said clamp immediately above said bolt.

8. The structure of claim 7, said last named means including a projection on a transverse portion of said clamp.

In testimony whereof I affix my signature.

LLOYD BLACKMORE.